(No Model.) 2 Sheets—Sheet 1.

A. HALLOWELL.
BEER COOLER.

No. 394,920. Patented Dec. 18, 1888.

WITNESSES:
Peter A. Fay
Charles H. Fisher

INVENTOR:
Albert Hallowell (No Model.) 2 Sheets—Sheet 2.

A. HALLOWELL.
BEER COOLER.

No. 394,920. Patented Dec. 18, 1888.

WITNESSES:
Peter G. Fay
Charles H. Fisher

INVENTOR:
Albert Hallowell

UNITED STATES PATENT OFFICE.

ALBERT HALLOWELL, OF LOWELL, MASSACHUSETTS, ASSIGNOR OF TWO-THIRDS TO JOHN C. HOYT, GERSHOM C. BASSETT, AND WILLIAM E. POTTER, OF SAME PLACE.

BEER-COOLER.

SPECIFICATION forming part of Letters Patent No. 394,920, dated December 18, 1888.

Application filed July 5, 1887. Serial No. 243,397. (No model.)

*To all whom it may concern:*

Be it known that I, ALBERT HALLOWELL, of Lowell, in the county of Middlesex and Commonwealth of Massachusetts, have invented a new and useful Improvement in Apparatus for Cooling Beer and other Substances, of which the following is a specification.

My invention relates to that class of apparatus for cooling hot wort or other liquids where the liquid is cooled by being sprayed into the atmosphere or submitted when in a finely-divided state to the action of air; and its object is to provide an inexpensive and efficient form of apparatus for the purpose of changing such liquids into a spray.

My invention is illustrated in the accompaing drawings, in which—

Figure 1:
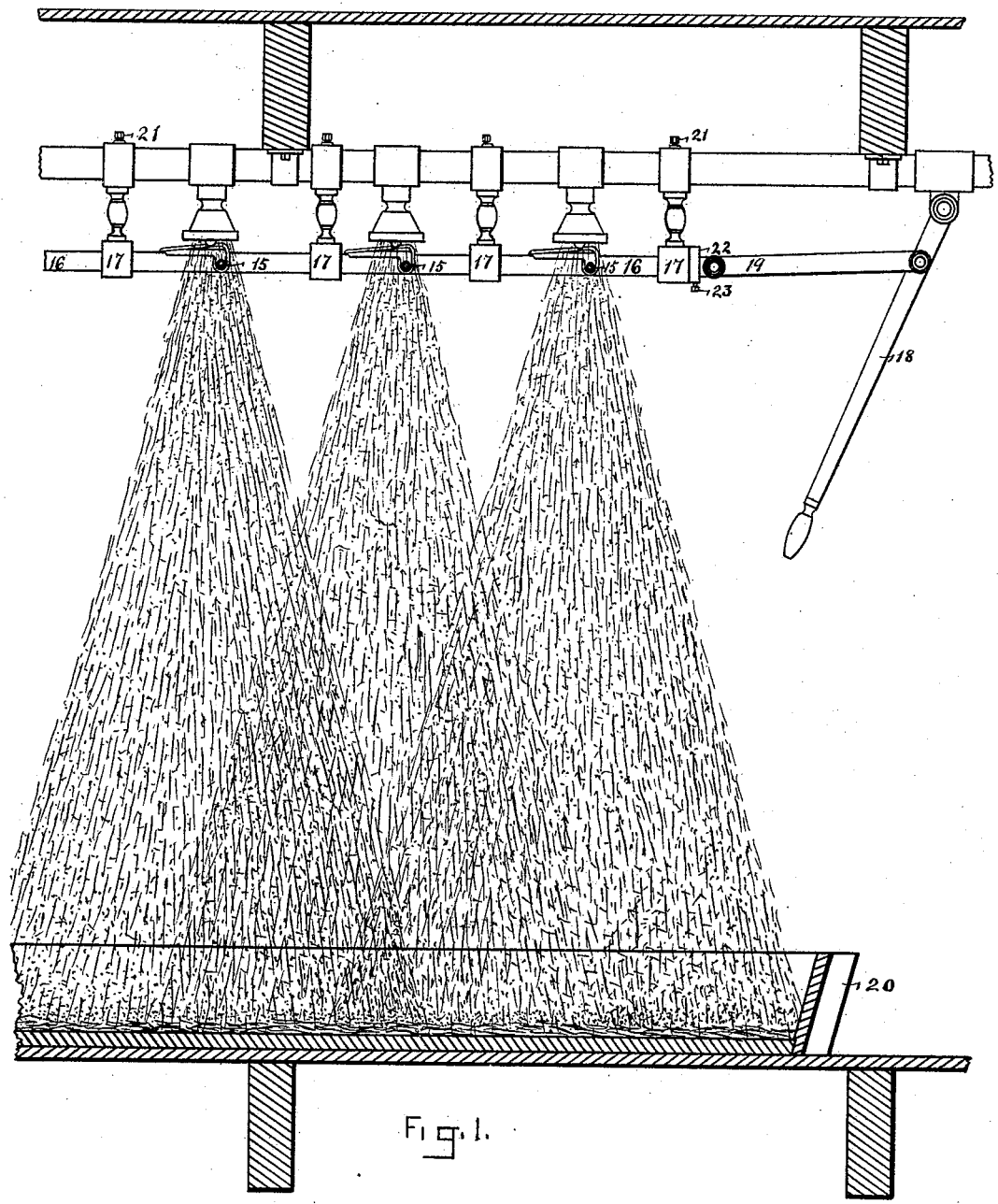
Figures 2, 3, 4:
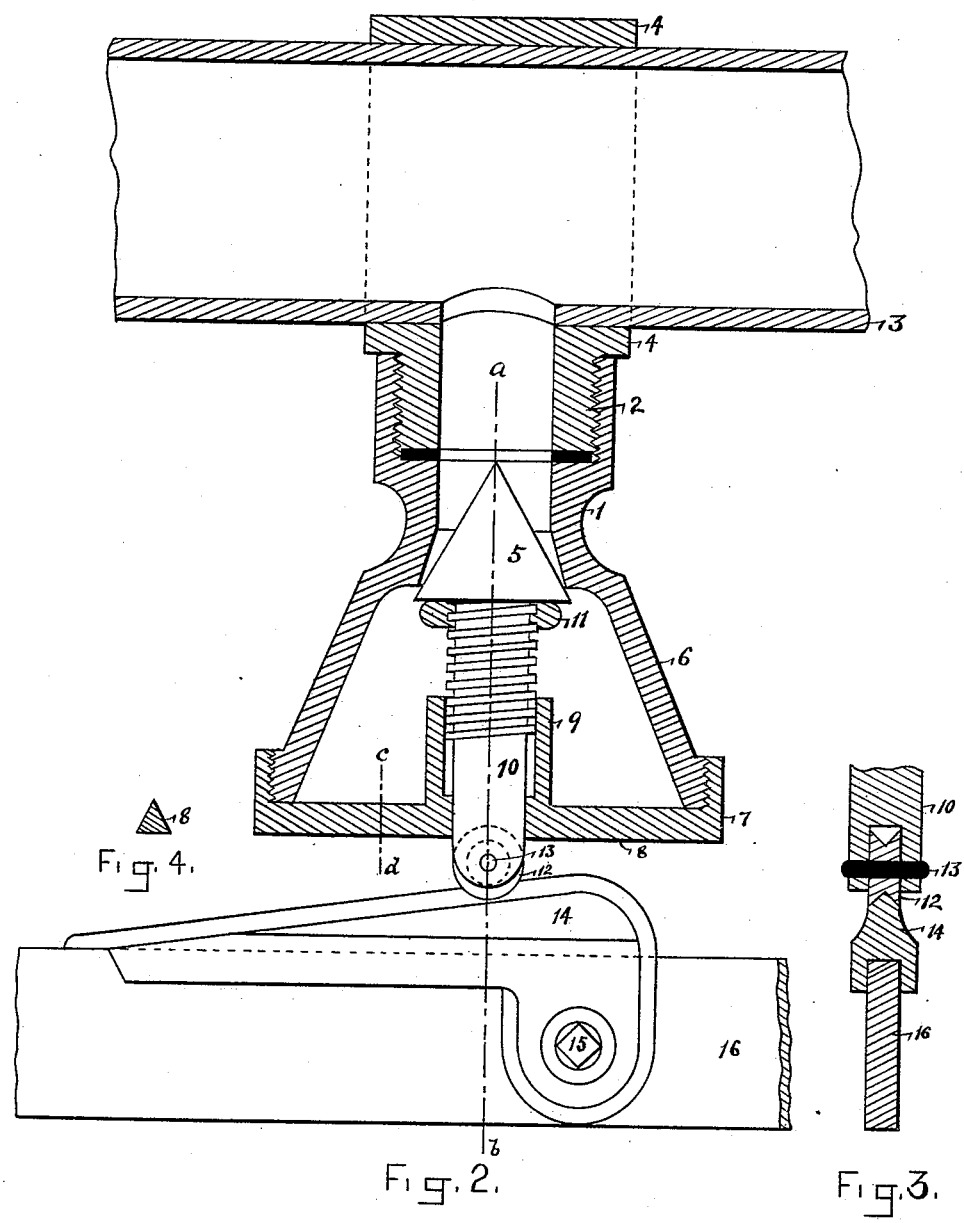

Figure 1 is an elevation, partly in section, of portions of a wort-cooling apparatus, showing the manner in which a number of spraying devices may be attached to a single pipe and simultaneously controlled at a single point. Fig. 2 is an elevation, partly in central vertical section, of one of the spraying devices shown in Fig. 1, portions of the main supply-pipe by which it is supported and of the flushing-bar, and the flushing-cam supported by said bar. Fig. 3 is a partial vertical section of the flushing-bar, the flushing-cam, and the main cone-stem with a roller in its end, and showing a portion of the section at the left of the line *a b* of Fig. 2. Fig. 4 is a section of the cross-bar which carries the stem-support in which the main cone is supported, taken at the line *c d* of Fig. 2.

Similar reference-numbers refer to similar parts in all of the views.

This invention resembles in some respects that which is shown in another application of mine, Serial No. 244,155, filed July 13, 1887, and like that depends for its successful operation upon the fact that when liquids, especially hot ones, are converted into a spray of fine particles, evaporation takes place very rapidly, and during this evaporation large quantities of heat are required in order to change the liquid to vapor. This heat may be absorbed from the liquid itself, the surrounding air, or from both, the temperature of the air, the liquid, or both, being lowered in the operation. It is desirable to supply large amounts of air to the apparatus here illustrated when it is being operated for the purpose of cooling beer, and this may be supplied in any ordinary way, such as by placing the apparatus in the open air or in a room through which large quantities of air are caused to pass. The spraying device here illustrated may sometimes be provided with a special means of supplying air to the spraying-head itself, like that shown in said No. 244,155, if it is considered desirable to do so.

The spraying device herein described may be used either singly or in connection with several others of the same construction, as shown in Fig. 1, and an important element of the apparatus is the means of adjusting from a distance the position of the spray-producing cone, although this element may sometimes with advantage be omitted.

The spray-producing device which I usually prefer to use is clearly shown in Fig. 2, where the main cone-support 1 is shown as provided with means by which it may be attached to a nipple, 2, that is supported by and communicates with the interior of the main supply-pipe 3. I prefer to form this nipple 2 upon a sleeve, 4, that may be slipped along the main supply-pipe 3 and turned thereon until the hole through the nipple communicates with a hole leading through the side of the pipe. The sleeve may then be soldered in place. By this means a supply-pipe belonging to an apparatus having several spraying heads may be easily and accurately fitted up. The main cone-support 1 is provided with a liquid-conduit having a valve-seat at its bottom and with means of supporting below said valve-seat the deflecting spray-producing cone 5. This cone is supported by any suitable means near to the main cone-support in the example illustrated by a bell-shaped piece, 6, of metal attached to and forming a part of the main cone-support, 1, and a ring, 7, attached to the bottom of the piece 6, provided with a cross-bar, 8, and central annular stem-support 9. Within the stem-support 9 is supported the cone-stem 10, which is shown as having a screw-thread upon its exterior surface, and a nut, 11, working thereon, the cone 5 upon its upper end and the roller 12, supported by the pin 13, in its lower end. The said screw-thread, nut, and roller may sometimes be dispensed with, although the device is so much more satisfactory when they are present that I usually desire to utilize them. Below the spraying device is supported in some convenient manner by the bearings 17 in the apparatus shown in Fig. 1 the flushing-bar 16, upon which are supported the flushing-cams 14. These cams are preferably made as shown, and placed astride upon the edge of the flushing-bar, and provided with set-screws 15 or equivalents therefor, by which they may be independently and adjustably secured to said bar.

The bearings 17 are shown as supported by sleeves which slip easily over the exterior surface of the main supply-pipe 3, and are secured in place by set-screws 21 or by being soldered to the pipe like the sleeves 4, although they may be supported in the proper place in any convenient way. The flushing-cams are preferably made with their working-edges rounded or sharp, as shown in Fig. 3, and with the roller 12 fitting said edge, although they may be made in any convenient shape and the roller dispensed with when it is desirable to do so. A cam, 14, is adjusted with reference to the flushing-bar 16 by holding the latter stationary in a suitable position and then, after loosening the set-screw 15, slipping the cam along the bar 16 under the roller 12 until the cone-stem is forced upward far enough to cause the cone to come in contact with the valve-seat, when the cam is secured in place by the set-screw 15.

The cam 14 may sometimes be dispensed with and the cone controlled entirely by the nut 11, which is, however, intended to be used mainly for the purpose of limiting the amount that the valve shall be opened in flushing and for the purpose of entirely shutting off the flow at any particular spraying-head when it may be desired to use the others on the main supply-pipe without it, the cone 5 in that case forming a valve. I do not, however, desire to limit myself to the exact form of screw or nut that is shown for this purpose.

It is evident that other equivalent cone-adjusters may be substituted for the nut 11 and used like that as a secondary cone-adjuster, which is independent of the flushing-bar 16.

The flushing-bar is preferably provided with some convenient means of quickly moving it backward and forward, in the case illustrated the lever 18 and the link 19 being used for this purpose, although any equivalent means may be used instead thereof. I do not desire to limit myself in the use of all forms of my invention to the exact means of adjusting the spraying device from the flushing-bar, as herein illustrated and described, as I am well aware that some other forms of mechanism for this purpose may be used, one form of which is specifically claimed in Case B, before referred to. I am also well aware that the means of adjusting the position of the cone-adjusters with respect to the flushing-bar 16, herein described, may be used in those structures where forms of cone-adjusters different from the cams 14 are made use of.

The method of operation of this device is as follows: The liquid to be cooled is by some ordinary and suitable means fed into the main supply-pipe 3 in such a manner as to maintain a considerable pressure therein. The flushing-bar is then adjusted in such a position that the spraying-cones 5 will be a slight distance from the valve-seats, when the liquid will flow out of the spraying-heads in a fine spray, which will fall into a suitable tub or vat, 20, placed on the floor below to receive it. The fineness of this spray and the amount of the cooling are controlled, as desired, by adjusting the spraying device to deliver a greater or less quantity of liquid. In order to continuously convert liquids in which are solid substances in suspension into a spray with this apparatus it is necessary to periodically flush the spraying-heads. This is done by quickly drawing back the flushing-bar, when the liquid will quickly rush in an augmented amount through the outlet of the spraying-head, carrying such substances with it, after which the flushing-bar is quickly pushed back and the liquid forced out in a spray again. I sometimes use a sliding stop, 22, upon the flushing-bar 16, which is clamped in place by a set-screw, 23, or other equivalent means, in order that the flushing-bar may be quickly and certainly replaced in the proper position for causing the cones 5 to produce a spray. This stop must then be unclamped when it is desirable to entirely stop the flow of liquid at all of the heads by the flushing-bar. I have found that it is possible to quickly remove enormous amounts of heat from hot bodies of liquid by passing them through this apparatus.

I do not desire to limit myself in the use of my invention to the exact form of all of the parts which are herein illustrated, since the form of several of these parts may be much changed without departing from my invention.

What I claim as new, and desire to secure by Letters Patent, is—

1. In a cooling device for hot fluids, a liquid-supply pipe combined with a liquid-spraying device which may be adjusted to control the spray it produces and to allow the liquid to flush out said spraying device, and a movable flushing-bar adapted when it is moved to adjust said spraying device to flush the same and to control said spray, substantially as described, and for the purposes specified.

2. A supply-pipe with a spraying device attached thereto, said spraying device being provided with a deflecting spray-producing cone, combined with a movable flushing-bar, and a cone-adjuster actuated by said flushing-bar for adjusting said cone by the motion of said flushing-bar, thereby controlling said spray and flushing said spraying device, substantially as described, and for the purposes specified.

3. A supply-pipe with a spraying device attached thereto, said spraying device being provided with a deflecting spray-producing cone, combined with a movable flushing-bar, and a cone-adjuster for adjusting said cone, thereby controlling said spray and flushing said spraying device, said cone-adjuster being actuated by said flushing-bar with respect to which it is itself adjustable, substantially as described, and for the purposes specified.

4. A supply-pipe with a spraying device attached thereto, said spraying device being provided with a deflecting spray-producing cone, combined with a movable flushing-bar, and a flushing-cam actuated by said flushing-bar and which adjusts the position of said cone when said flushing-bar is moved, thereby controlling said spray and flushing said spraying device, substantially as described, and for the purposes specified.

5. A supply-pipe with a spraying device attached thereto, said spraying device being provided with a deflecting spray-producing cone, combined with a movable flushing-bar provided with a cone-adjuster which adjusts the position of said cone when said flushing-bar is moved to control the spray it produces and to flush said spraying device, and a secondary cone-adjuster independent of said flushing-bar for adjusting said cone without the use of said flushing-bar and the cone-adjuster with which it is provided, substantially as described, and for the purposes specified.

6. The beer-cooling apparatus, which consists of a main supply-pipe with a spraying device attached thereto, said spraying device having a liquid-conduit and a valve-seat at the lower end thereof, a deflecting spray-producing cone below said valve-seat and forming a valve which seats on said valve-seat, a movable flushing-bar provided with a cone-adjuster which adjusts said cone when said flushing-bar is moved to control the spray it produces and to flush said spraying device, and a secondary cone-adjuster consisting of a screw, a nut, and a support for said screw and nut, for adjusting the position of said cone independently of said flushing-bar, substantially as described, and for the purposes specified.

ALBERT HALLOWELL.

Witnesses:
PETER A. FAY,
CHARLES H. FISHER.